US012749497B2

(12) United States Patent
Nakamura

(10) Patent No.: US 12,749,497 B2
(45) Date of Patent: Sep. 29, 2026

(54) INFORMATION PROCESSING SYSTEM THAT ALLOWS USER TO ESTABLISH CONVERSATION WITH DESIRED PERSON THROUGH AVATAR EVEN IN NOISY ENVIRONMENT IN VIRTUAL SPACE, EDGE DEVICE, SERVER, CONTROL METHOD, AND STORAGE MEDIUM

(71) Applicant: CANON KABUSHIKI KAISHA, Tokyo (JP)

(72) Inventor: Tomonori Nakamura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 18/892,768

(22) Filed: Sep. 23, 2024

(65) Prior Publication Data

US 2025/0111858 A1 Apr. 3, 2025

(30) Foreign Application Priority Data

Oct. 3, 2023 (JP) ................................ 2023-172214

(51) Int. Cl.
*G10L 21/0364* (2013.01)
*G06F 3/01* (2006.01)
(Continued)

(52) U.S. Cl.
CPC .......... *G10L 21/0364* (2013.01); *G06F 3/011* (2013.01); *G06T 13/40* (2013.01); *G10L 17/02* (2013.01); *G10L 21/034* (2013.01)

(58) Field of Classification Search
CPC ..... G10L 17/00; G10L 21/00; G10L 21/0316; G10L 21/0324; G10L 21/0364; G10L 21/057
See application file for complete search history.

(56) References Cited

U.S. PATENT DOCUMENTS 8,605,863 B1 12/2013 Sauriol
9,258,337 B2 2/2016 Hyndman
(Continued)

FOREIGN PATENT DOCUMENTS

JP 2016-187063 A 10/2016
JP 6289703 B1 3/2018
(Continued)

OTHER PUBLICATIONS

Du, Ting, Translation of CN-112015365-A, 2020.*
Sako, Yoichiro, Translation of CN-104488288-B, 2018.*

*Primary Examiner* — Paras D Shah
(74) *Attorney, Agent, or Firm* — Venable LLP

(57) ABSTRACT

An information processing system that allows a user to establish a conversation with a desired person through an avatar even in a noisy environment in a virtual space is provided. The information processing system that comprises multiple user terminals, each including a voice input unit and a voice output unit, and provides a virtual space including avatars linked to the multiple user terminals, includes a unit to generate voice data whose sound source is each avatar linked to each user terminal, and one or more processors and/or circuitry configured to execute a voice data transmitting processing, execute an association determination processing, execute a voice data analysis processing, and execute a sound volume adjustment processing that, when first voice data is associated with a second avatar and second voice data disturbs the first voice data, adjusts a sound volume of voice data to be transmitted to a second user terminal.

21 Claims, 10 Drawing Sheets

(51) Int. Cl.

| | |
|---|---|
| ***G06T 13/40*** | (2011.01) |
| ***G10L 17/02*** | (2013.01) |
| ***G10L 21/034*** | (2013.01) |

(56) References Cited

U.S. PATENT DOCUMENTS

| | | | | |
|---|---|---|---|---|
| 9,392,037 | B2 | 7/2016 | Hyndman | |
| 11,935,168 | B1 * | 3/2024 | Akmal | G06T 11/60 |
| 2009/0276707 | A1 * | 11/2009 | Hamilton, II | A63F 13/30 715/753 |
| 2013/0144623 | A1 * | 6/2013 | Lord | G09B 21/006 704/E15.001 |
| 2024/0361831 | A1 * | 10/2024 | Koizuka | G06F 3/013 |
| 2025/0348150 | A1 * | 11/2025 | Yamamoto | G06F 3/017 |

FOREIGN PATENT DOCUMENTS

| | | | |
|---|---|---|---|
| JP | 2022-076189 | A | 5/2022 |
| WO | 2009/117434 | A | 9/2009 |

* cited by examiner

FIG. 5

| NAME OF AVATAR | FRIEND AVATAR |
|---|---|
| A-SAN | B-SAN<br>C-SAN |
| B-SAN | A-SAN |
| C-SAN | A-SAN |
| D-SAN | |

INFORMATION PROCESSING SYSTEM THAT ALLOWS USER TO ESTABLISH CONVERSATION WITH DESIRED PERSON THROUGH AVATAR EVEN IN NOISY ENVIRONMENT IN VIRTUAL SPACE, EDGE DEVICE, SERVER, CONTROL METHOD, AND STORAGE MEDIUM

BACKGROUND OF THE INVENTION

Field of the Invention

The present invention relates to an information processing system, an edge device, a server, a control method, and a storage medium, and more particularly to an information processing system, an edge device, a server, a control method, and a storage medium that control communication of avatars in a virtual space.

Description of the Related Art

It has become common that a plurality of users each wear a head mounted display (an HMD) and communicate with each other through their own alter egos, known as avatars, in a virtual space created by virtual reality (VR). Voice chat is often used as a communication means (a communication tool) between the users wearing the HMD.

Japanese Patent No. 6289703 discloses a technique for imparting directionality to a voice outputted from a sound source object of a first avatar and setting a sound volume parameter of the outputted voice according to a position of a sound collection object of a second avatar.

For example, consider a situation in which a user and an acquaintance participate as spectators in a live music event held in a virtual space, each wearing an HMD. At the live music event, the surroundings for the user and the acquaintance (themselves) are usually noisy due to singing and playing of performers, cheers of other spectators, etc. Therefore, there is an issue that even in the case that the acquaintance speaks to the user while the user and the acquaintance are participating in the live music event held in the virtual space, the user has difficulty hearing the acquaintance's voice and having a conversation with the acquaintance.

In the case that the technique disclosed in Japanese Patent No. 6289703 is applied in this situation, several problems are expected to occur. The first problem is that setting of the sound volume parameter can only be controlled on the sound source object side, so even in the case that the user of the second avatar (the sound collection object side) thinks that "he or she is not able to hear the voice outputted from the first avatar (the sound source object side)", this cannot be solved. The second problem is that the user of the first avatar (the sound source object side) has to determine whether or not it is necessary to change the setting of the sound volume parameter. The third problem is that in the case that there are avatar(s) of other spectator(s) near a desired acquaintance (the second avatar), the loud voice outputted from the sound source object of the first avatar will reach the other spectator(s) and cause a nuisance.

SUMMARY OF THE INVENTION

The present invention provides an information processing system that allows a user to establish a conversation with a desired person through an avatar even in a noisy environment in a virtual space, an edge device, a server, a control method, and a storage medium.

Accordingly, the present invention provides an information processing system that comprises three or more multiple user terminals, each including a voice input unit and a voice output unit, connected via a network, and provides a virtual space including avatars linked to the multiple user terminals, respectively, the information processing system comprising a voice generating unit configured to generate voice data whose sound source is each avatar linked to each of the multiple user terminals based on a voice inputted into the voice input unit of each of the multiple user terminals, and one or more processors and/or circuitry configured to execute a voice data transmitting processing that transmits, to the multiple user terminals, the voice data whose sound source is each avatar, execute an association determination processing that determines whether or not first voice data whose sound source is a first avatar linked to a first user terminal among the multiple user terminals is associated with a second avatar linked to a second user terminal among the multiple user terminals, execute a voice data analysis processing that analyzes the first voice data among voice data to be transmitted to the second user terminal by the voice data transmitting processing, and second voice data excluding the first voice data, and execute a sound volume adjustment processing that, in a case that it is determined in the association determination processing that the first voice data is associated with the second avatar and it is analyzed in the voice data analysis processing that the second voice data disturbs the first voice data, adjusts a sound volume of the voice data to be transmitted to the second user terminal, which is outputted from the voice output unit of the second user terminal.

Accordingly, the present invention provides an edge device that functions as one of the multiple user terminals, which are included in the information processing system, the edge device comprising one or more processors and/or circuitry configured to execute the sound volume adjustment processing.

Accordingly, the present invention provides a server that is included in the information processing system and that is connected to the multiple user terminals via the network, the server comprising one or more processors and/or circuitry configured to execute the voice data transmitting processing, the association determination processing, and the voice data analysis processing.

According to the present invention, the user is able to establish the conversation with the desired person through the avatar even in the noisy environment in the virtual space.

Further features of the present invention will become apparent from the following description of exemplary embodiments with reference to the attached drawings.

BRIEF DESCRIPTION OF THE DRAWINGS

FIG. 5 is a table that shows an example of a friend registration status list, which is data registered in advance by the server and indicates whether or not there is a friendly relationship between avatars.

DESCRIPTION OF THE EMBODIMENTS

Figure 1A:
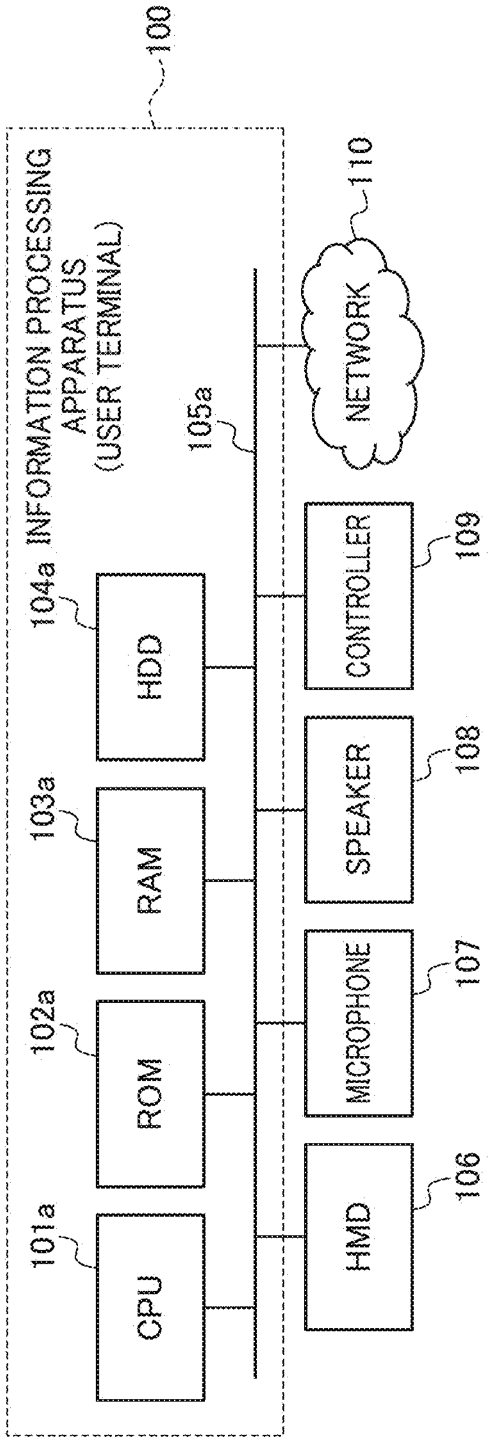
FIG. 1A is a block diagram that shows an example of a hardware configuration of a user terminal serving as an edge device according to an embodiment of the present invention.

The present invention will now be described in detail below with reference to the accompanying drawings showing embodiments thereof.

Hereinafter, a preferred embodiment of the present invention will be described in detail with reference to the accompanying drawings. It should be noted that the following embodiment does not limit the present invention as defined by the claims. Although the following embodiment will describe a plurality of features, not all of the plurality of features are necessarily essential to the present invention, and the plurality of features may be combined in any desired manner. Furthermore, in the accompanying drawings, the same or similar configurations (components) will be given the same reference numerals and duplicated descriptions will be omitted.

Figure 1B:
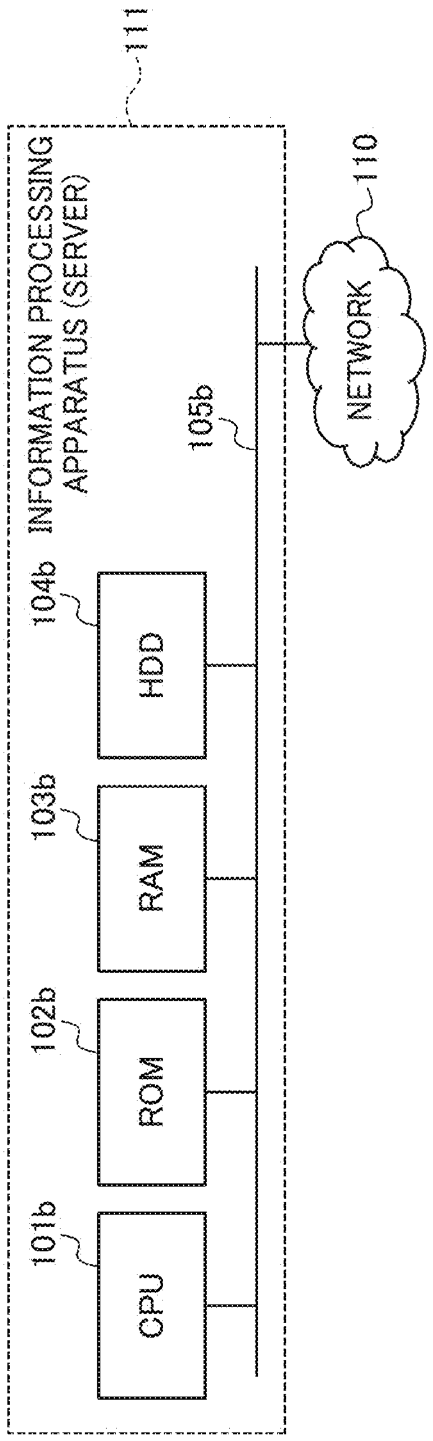
FIG. 1B is a block diagram that shows an example of a hardware configuration of a server according to the embodiment of the present invention.
Figure 1C:
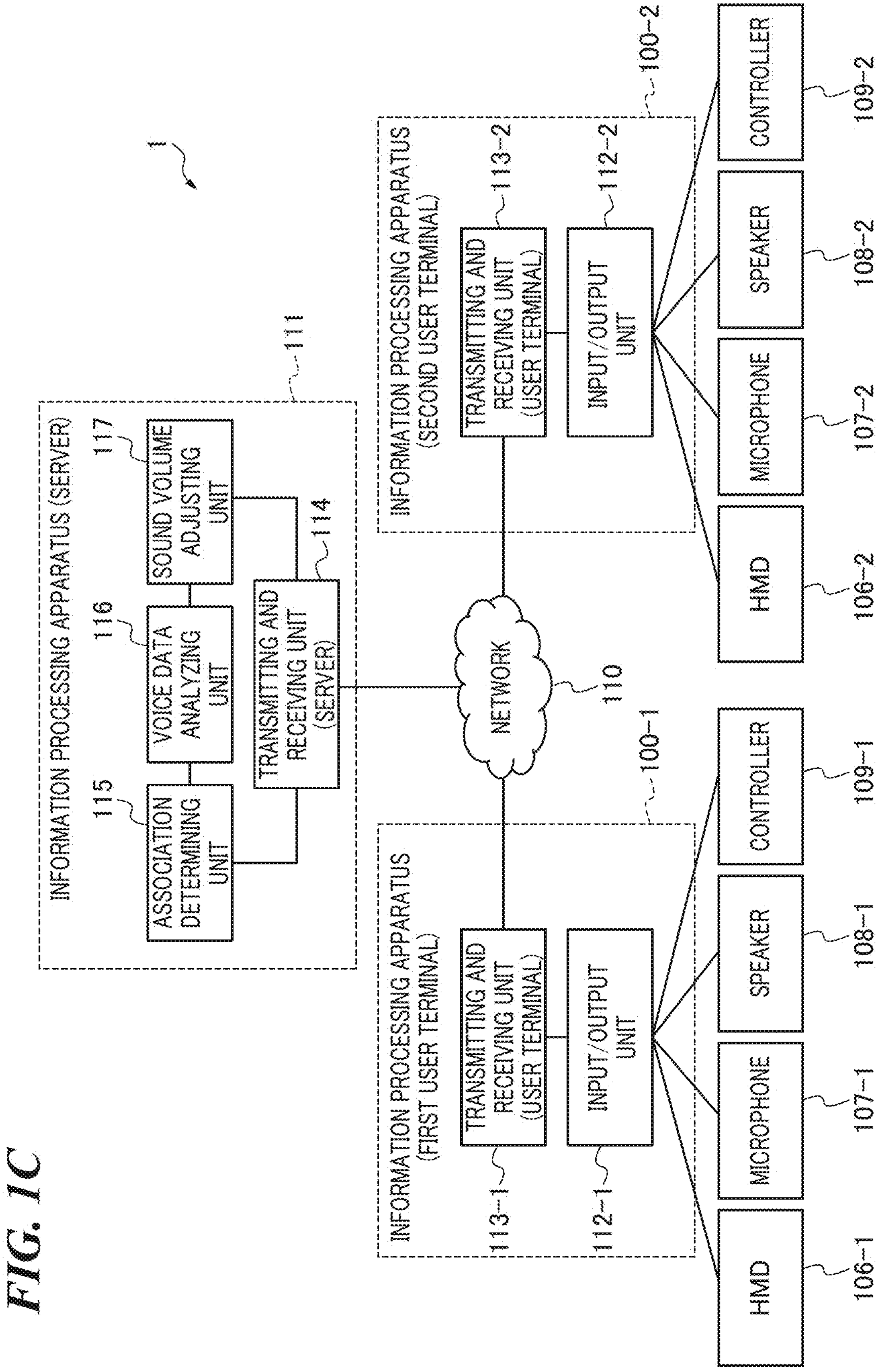
FIG. 1C is a block diagram that shows an example of an overall functional configuration of an information processing system according to the embodiment of the present invention, which includes the user terminals and the server.

FIGS. 1A, 1B, and 1C are block diagrams that show an example of a configuration of a server 111 according to the present embodiment and a plurality of user terminals (hereinafter, collectively referred to as "user terminals 100") serving as edge devices according to the present embodiment that are connected to the server 111.

FIG. 1A is a block diagram that shows an example of a hardware configuration of the user terminal 100. The user terminal 100 according to the present embodiment is an information processing apparatus that includes a central processing unit (a CPU) 101*a*, a read only memory (a ROM) 102*a*, a random access memory (a RAM) 103*a*, and a hard disk drive (an HDD) 104*a*, in which respective functional units (the CPU 101*a*, the ROM 102*a*, the RAM 103*a*, and the HDD 104*a*) are communicably connected to each other via a bus 105*a*.

The CPU 101*a* executes various kinds of processing by using programs and data stored in the RAM 103*a* or the ROM 102*a*. As a result, the CPU 101*a* performs the operation control of the user terminal 100 as a whole, and also executes or controls various kinds of processing which will be described below as those performed by the user terminal 100.

The ROM 102*a* stores setting data for the user terminal 100, computer programs or data related to the startup of the user terminal 100, or computer programs or data related to the basic operations of the user terminal 100, and the like.

The RAM 103*a* includes an area for storing computer programs or data loaded from the ROM 102*a* or the HDD 104*a*. In addition, the RAM 103*a* includes a working area that is used when the CPU 101*a* executes various kinds of processing. In this way, the RAM 103*a* is able to provide various kinds of areas as needed.

The HDD 104*a* is an example of a large-capacity information storage device. The HDD 104*a* stores an operating system (an OS), or computer programs or data for causing the CPU 101*a* to execute and control the various kinds of processing which will be described below as those performed by the user terminal 100. In addition, in the above description, registering and retaining of various kinds of information may be performed by the HDD 104*a* or the RAM 103*a*. The computer programs or the data stored in the HDD 104*a* are loaded into the RAM 103*a* as appropriate under the control of the CPU 101*a*, and are processed by the CPU 101*a*.

It should be noted that in addition to the HDD 104*a* or instead of the HDD 104*a*, a medium (a recording medium) and a drive device that reads and writes computer programs and/or data from and into the medium may be provided. Known examples of such a medium include a flexible disk (an FD), a CD-ROM, a DVD, a USB memory, an MO disk, and a flash memory.

The hardware configuration of the information processing apparatus applicable to the user terminal 100 is not limited to the configuration shown in FIG. 1A, and is able to be modified and/or changed as appropriate. In addition, the user terminal 100 is further communicably connected to external apparatuses including an HMD 106, a microphone 107, a speaker 108, a controller 109, and a network 110. However, the user terminal 100 may include some or all of functions of these external apparatuses. For example, in FIG. 1A, the HMD 106 and the user terminal 100 are separate apparatuses, but the HMD 106 and the user terminal 100 may be integrated to configure a single user terminal 100.

The HMD 106 includes a function of displaying a field-of-view image in a virtual space that is created by VR and is provided by the server 111. In addition, the HMD 106 includes various kinds of sensors (a first detecting unit and a second detecting unit) built therein for detecting an inclination of the HMD 106 itself, a line of sight of a user wearing the HMD 106 (hereinafter, referred to as "a wearing user"), movements of hands of the wearing user, etc. The CPU 101 (a line-of-sight direction setting unit) sets a line-of-sight direction (a gaze direction) of an avatar of the wearing user based on a position of the avatar of the wearing user and the line of sight of the wearing user that has been detected by the HMD 106, and determines a field-of-view image to be displayed by the HMD 106 in accordance with the line-of-sight direction. Furthermore, the CPU 101 (an avatar movement control unit) moves hands of the avatar of the wearing user, which is displayed within the virtual space, in response to the movements of the hands of the wearing user that have been detected by the HMD 106. It should be noted that based on the detection results obtained by the various kinds of sensors built in the HMD 106, the server 111 may perform setting of the line-of-sight direction of the wearing user in the virtual space, the determination of the field of view image, and the control of movements of the hands of the avatar of the wearing user.

When the microphone 107 (serving as a voice input unit) accepts an input of the wearing user's voice, the microphone 107 (serving as a voice generating unit) generates voice data thereof and then transmits the generated voice data to the CPU 101*a*. The CPU 101*a* transmits the voice data from the microphone 107 to the server 111 as voice data whose sound source is an avatar linked to the user terminal 100. It should be noted that in the case that the wearing user is a performer of a live music event held in the virtual space, the microphone 107 accepts an input of a singing voice or a playing sound of the performer. The speaker 108 (serving as a voice output unit) outputs voice data collected in the virtual space.

The controller 109 (serving as a setting unit) accepts input(s) from the wearing user and reflects the contents of the input(s) in moving the position of the avatar, which is an alter ego of the wearing user in the virtual space (which represents the wearing user in the virtual space), and in operating a user interface (a UI) displayed in the virtual space.

FIG. 1B is a block diagram that shows an example of a hardware configuration of the server 111.

Unlike the user terminal 100, the server 111 is not connected to the external apparatuses such as the HMD 106, the microphone 107, the speaker 108, and the controller 109, but the server 111 is an information processing apparatus whose hardware configuration is the same as that of the user terminal 100 except for that the server 111 is not connected to the external apparatuses. In other words, the server 111 includes a CPU 101*b*, a ROM 102*b*, a RAM 103*b*, and an HDD 104*b*, and respective functional units (the CPU 101*b*, the ROM 102*b*, the RAM 103*b*, and the HDD 104*b*) are communicably connected to each other via a bus 105*b*. In the hardware configuration shown in FIG. 1B, the functional units indicated by the same reference numerals excluding the suffix (a, b) as in FIG. 1A are the same as those in the hardware configuration shown in FIG. 1A described above, and therefore duplicated descriptions will be omitted.

In addition, numerical values, processing timings, processing orders, the processing entities, transmission destinations/transmission sources/storage locations of data (information), etc., which are used in the embodiment described below, are given as an example to provide a concrete description, and are not intended to be limited to such an example.

FIG. 1C is a block diagram that shows an example of an overall functional configuration of an information processing system 1 according to the present embodiment, which includes the user terminals 100 and the server 111.

As shown in FIG. 1C, the user terminals 100 include a first user terminal 100-1, a second user terminal 100-2, and user terminals 100-3 to 100-*n* (n≥3) not shown, which have the same hardware configuration and the same functional units but are used by different users. Hereinafter, the functional units of the user terminal 100 will be described by using the first user terminal 100-1, and duplicated descriptions of the functional units of the second user terminal 100-2 and the user terminals 100-3 to 100-*n* (not shown) will be omitted.

The first user terminal 100-1 includes an input/output unit 112-1 and a transmitting and receiving unit (user terminal) 113-1, and the server 111 according to the present embodiment includes a transmitting and receiving unit (server) 114, an association determining unit 115, a voice data analyzing unit 116, and a sound volume adjusting unit 117.

The respective functional units of the first user terminal 100-1 and the server 111 that are shown in FIG. 1C may be implemented by hardware or by software (computer programs). In the latter case, an information processing apparatus capable of executing the computer programs is applicable to the user terminal 100 and the server 111.

The input/output unit 112-1 accepts data inputted from external apparatuses (an HMD 106-1, a microphone 107-1, a speaker 108-1, a controller 109-1, etc.) connected to the first user terminal 100-1, and outputs data to these external apparatuses.

The transmitting and receiving unit (user terminal) 113-1 transmits data retained by the first user terminal 100-1 (for example, voice data generated by the microphone 107-1, the position of the avatar of the wearing user, the movements of the hands of the wearing user, etc.) to the server 111 via the network 110. In addition, the transmitting and receiving unit (user terminal) 113-1 receives data transmitted from the server 111 via the network 110.

The transmitting and receiving unit (server) 114 (a voice data transmitting unit) transmits data retained by the server 111 (for example, voice data whose sound source is each avatar in the virtual space, a position of each avatar, movements of hands of each avatar, etc.) to the user terminal 100, which is the transmission destination, via the network 110. In addition, the transmitting and receiving unit (server) 114 receives data transmitted from the user terminal 100, which is the transmission source, via the network 110.

With such a configuration, the voice data whose sound source is each avatar in the virtual space, information on the position of each avatar in the virtual space, and information on the movements of the hands of each avatar are shared between the server 111 and the user terminal 100.

The association determining unit 115 (an association determining unit) determines whether or not the voice data transmitted from the first user terminal 100-1 is associated with an avatar linked to the second user terminal 100-2.

In the case that the association determining unit 115 determines that the voice data transmitted from the first user terminal 100-1 is associated with the avatar linked to the second user terminal 100-2, the voice data analyzing unit 116 (a voice data analyzing unit) analyzes the voice data to be transmitted to the second user terminal 100-2.

The sound volume adjusting unit 117 (a sound volume adjusting unit) adjusts a sound volume of the voice data to be transmitted to the second user terminal 100-2, which is outputted from a speaker 108-2.

Hereinafter, with reference to FIGS. 2, 3A, 3B, and 3C, a processing of adjusting a sound volume of voice data in accordance with a situation in the virtual space, which is executed in the first user terminal 100-1, the second user terminal 100-2, and the server 111 in the present embodiment, will be described.

First, an example of the processing of adjusting the sound volume of the voice data in accordance with the situation in the virtual space according to the present embodiment, which is executed in the information processing system 1, will be described with reference to a flowchart of FIG. 2.

Figure 2:
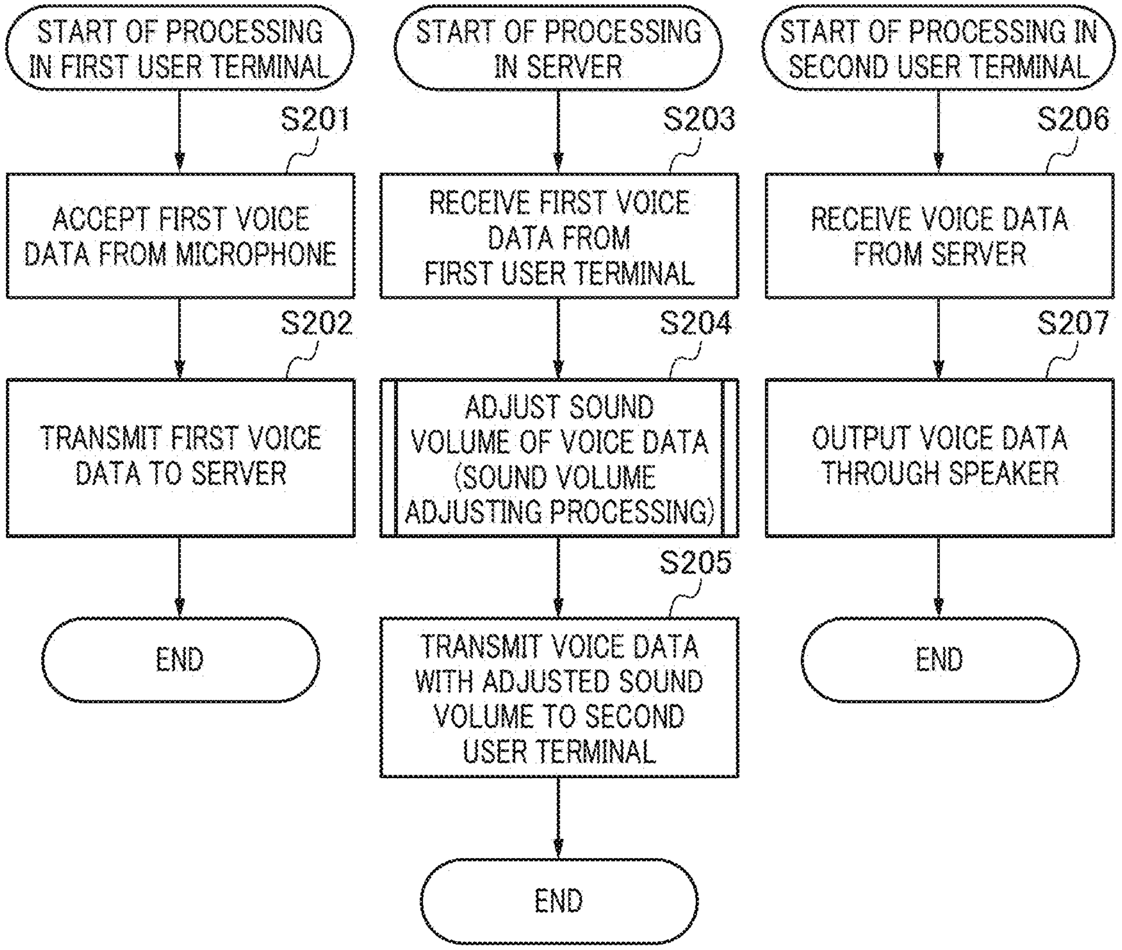
FIG. 2 is a flowchart that shows an example of a processing of adjusting a sound volume of voice data in accordance with a situation in a virtual space, which is executed in the information processing system.

As shown in FIG. 2, steps S201 and S202 are executed in the first user terminal 100-1, steps S203 to S205 are executed in the server 111, and steps S206 and S207 are executed in the second user terminal 100-2.

In the step S201, the input/output unit 112-1 accepts a voice uttered by a user of the first user terminal 100-1 into the microphone 107-1 as first voice data.

In the step S202, the transmitting and receiving unit (user terminal) 113-1 transmits the first voice data accepted in the step S201 to the server 111 via the network 110, and the present processing on the side of the first user terminal 100-1 ends.

In the step S203, the transmitting and receiving unit (server) 114 receives, via the network 110, the first voice data transmitted in the step S202.

In the step S204, the association determining unit 115, the voice data analyzing unit 116, and the sound volume adjusting unit 117 execute a sound volume adjustment processing that adjusts the sound volume of the voice data to be transmitted to the second user terminal 100-2. The sound volume adjustment processing will be described in detail below with reference to FIG. 3A.

In the step S205, the transmitting and receiving unit (server) 114 transmits the voice data whose sound volume has been adjusted in the step S204 to the second user terminal 100-2 via the network 110, and the present processing on the side of the server 111 ends.

In the step S206, a transmitting and receiving unit (user terminal) 113-2 receives the voice data transmitted from the server 111 via the network 110 in the step S205.

In the step S207, an input/output unit 112-2 outputs the voice data that has been received in the step S206 from the speaker 108-2 at the sound volume that has been adjusted in the step S204, and the present processing on the side of the second user terminal 100-2 ends.

Next, an example of the sound volume adjustment processing in the step S204 of FIG. 2 executed by the server 111 will be described with reference to a flowchart of FIG. 3A.

Figure 3A:
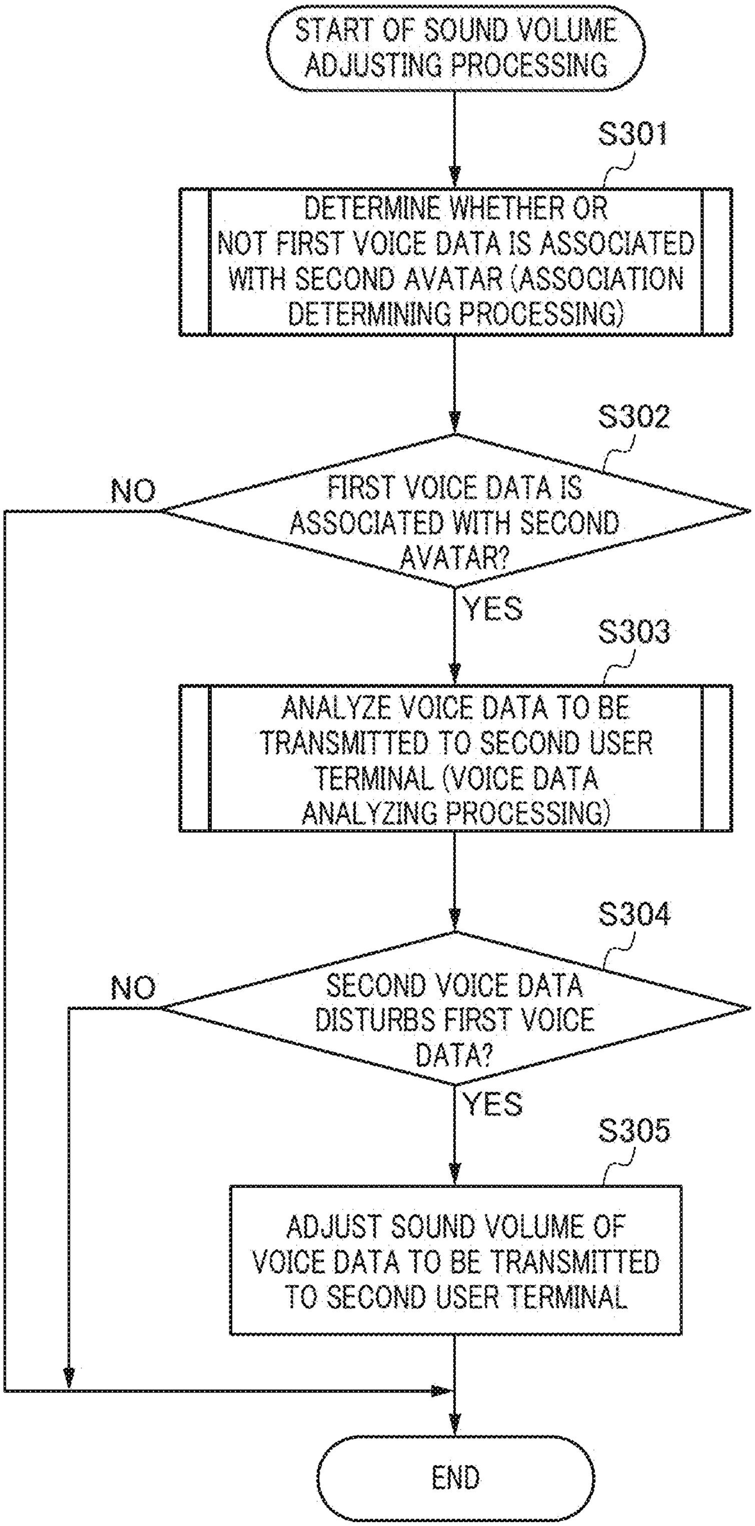
FIG. 3A is a flowchart that shows an example of a sound volume adjustment processing performed in a step S204 of FIG. 2.

As shown in FIG. 3A, first, in a step S301, the association determining unit 115 executes an association determination processing that determines whether or not the first voice data received from the first user terminal 100-1 in the step S203 is associated with a second avatar linked to the second user terminal 100-2. The association determination processing will be described in detail below with reference to FIG. 3B. It should be noted that the second avatar refers to an avatar of a wearing user of an HMD 106-2. That is, the first voice data is associated with the second avatar, which means that the user of the first user terminal 100-1 is speaking to a user of the second user terminal 100-2.

In a step S302, in the case that the result of the association determination processing performed in the step S301 is a determination result indicating that the first voice data is associated with the second avatar, the association determining unit 115 advances the sound volume adjustment processing to a step S303, and otherwise, ends the sound volume adjustment processing.

In the step S303, the voice data analyzing unit 116 executes a voice data analysis processing that analyzes the first voice data and second voice data excluding the first voice data, among the voice data to be transmitted to the second user terminal 100-2. The voice data analysis processing will be described in detail below with reference to FIG. 3C. It should be noted that the second voice data refers to, for example, in the case that a live music event is being held in the virtual space, all other voice data other than the first voice data, such as singing voices of performers, playing sounds of performers, and cheers of other spectators, the performers and the other spectators using the user terminals 100-3 to 100-*n* (not shown).

In a step S304, in the case that the result of the voice data analysis processing performed in the step S303 is an analysis result indicating that the second voice data disturbs the first voice data, the voice data analyzing unit 116 advances the sound volume adjustment processing to a step S305, and otherwise, ends the sound volume adjustment processing. The second voice data disturbs the first voice data, which means a situation in which the first voice data cannot be heard or is very difficult to hear due to the second voice data.

In the step S305, the sound volume adjusting unit 117 adjusts the sound volume of the voice data to be transmitted to the second user terminal 100-2, and then ends the sound volume adjustment processing. The sound volume of the voice data to be transmitted to the second user terminal 100-2 is adjusted by increasing the sound volume of the first voice data or decreasing the sound volume of the second voice data in accordance with the settings of the server 111 or the second user terminal 100-2. In this way, in the case that the second voice data disturbs the first voice data, by increasing the sound volume of the first voice data, the first voice data becomes able to be heard. Alternatively, in the case that the second voice data disturbs the first voice data, by decreasing the sound volume of the second voice data, the first voice data becomes able to be heard relatively.

Next, an example of the association determination processing in the step S301 of FIG. 3A executed by the server 111 will be described with reference to a flowchart of FIG. 3B.

Figure 3B:
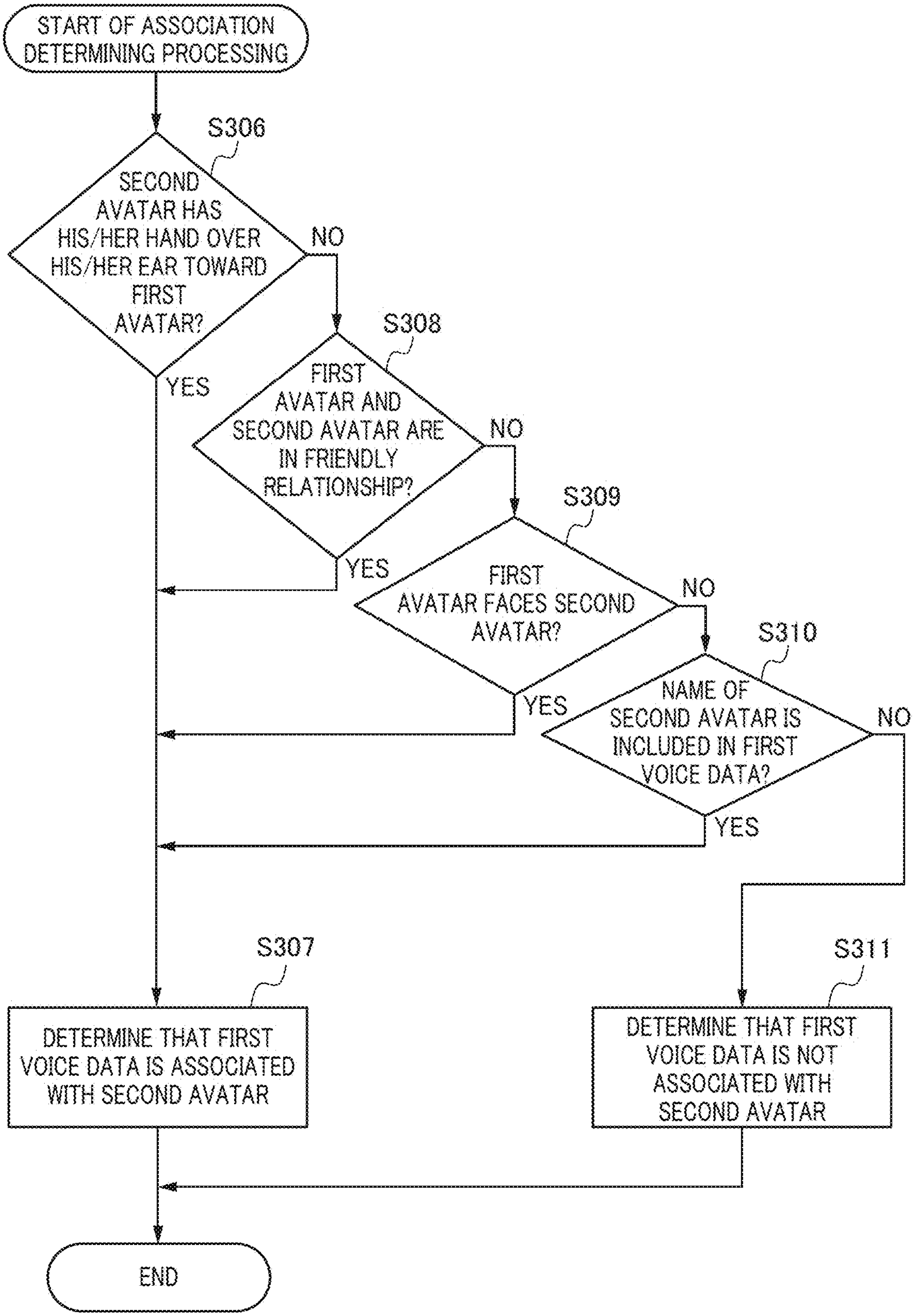
FIG. 3B is a flowchart that shows an example of an association determination processing performed in a step S301 of FIG. 3A.

As shown in FIG. 3B, first, in a step S306, the association determining unit 115 determines whether or not the second avatar is placing his/her hand on his/her ear toward a first avatar (an avatar of a wearing user of the HMD 106-1), which is the sound source of the first voice data. In the case that the second avatar is placing his/her hand on his/her ear toward the first avatar (YES in the step S306), the association determination processing proceeds to a step S307, and otherwise (NO in the step S306), the association determination processing proceeds to a step S308. It should be noted that based on a position of the second avatar set by a user input to a controller 109-2 and movements of hands of the wearing user detected by the HMD 106-2, the association determining unit 115 determines whether or not the second avatar is placing his/her hand on his/her ear toward the first avatar. Here, the state in which the second avatar is placing his/her hand on his/her ear means a state in which the wearing user of the HMD 106-2 is placing his/her hand on his/her ear. In other words, even in the case that the second avatar itself does not have an organ equivalent to an ear, when the second avatar's hand is positioned on the side face of the second avatar's face, the association determining unit 115 determines that the second avatar is placing his/her hand on his/her ear. In other words, since the gesture of placing a hand on an ear is one that is performed in the real space to make it easier to hear a sound from a specific direction, in the case that the specific direction is a direction of the first avatar, it is determined that the first voice data is associated with the second avatar.

In the step S307, the association determining unit 115 determines that the first voice data is associated with the second avatar, and then ends the association determination processing.

In the step S308, the association determining unit 115 determines whether or not the first avatar and the second avatar are in a friendly relationship. In the case that the first avatar and the second avatar are in a friendly relationship (YES in the step S308), the association determination processing proceeds to the step S307, and otherwise (NO in the step S308), the association determination processing proceeds to a step S309. The case where the first avatar and the second avatar are in a friendly relationship is, for example, a case where the first avatar and the second avatar have been registered in the server 111 as friends with each other. The details of this determination method will be described below with reference to FIG. 5.

In the step S309, the association determining unit 115 determines whether or not the first avatar is facing a direction of the second avatar (the first avatar faces the second avatar). In the case that the first avatar faces the second avatar (YES in the step S309), the association determination processing proceeds to the step S307, and otherwise (NO in the step S309), the association determination processing proceeds to a step S310. The case where the first avatar faces the second avatar is, for example, a case where the second avatar is present in a line-of-sight direction of the first avatar or the second avatar is present on an extension line in front of the first avatar's face. As described above, whether or not the second avatar is present on the extension line in front of the first avatar's face is determined based on the position of the first avatar set by a user operation with respect to the controller 109-1 and the position of the second avatar set by a user operation with respect to the controller 109-2.

In the step S310, the association determining unit 115 determines whether or not a name of the second avatar is included in the first voice data. Specifically, the association determining unit 115 performs a voice recognition processing and a natural language processing with respect to the first voice data, and determines whether or not a name "B-san" displayed above the head of the second avatar, which will be described below with reference to FIGS. 4A, 4B, 4C, 4D, and 4E, is included in the first voice data. In the case that the name of the second avatar is included in the first voice data (YES in the step S310), the association determination processing proceeds to the step S307, and otherwise (NO in the step S310), the association determination processing proceeds to a step S311.

In the step S311, the association determining unit 115 determines that the first voice data is not associated with the second avatar, and then ends the association determination processing.

Next, an example of the voice data analysis processing in the step S303 of FIG. 3A executed by the server 111 will be described with reference to a flowchart of FIG. 3C.

Figure 3C:
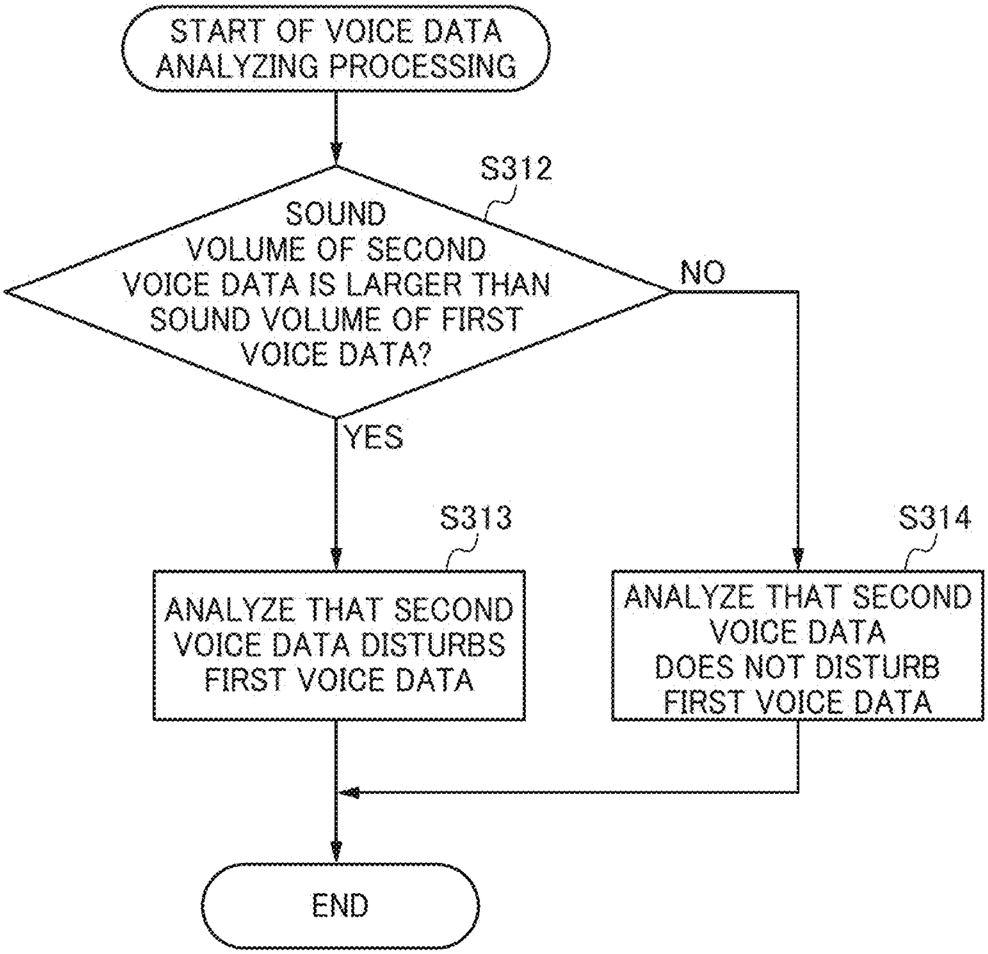
FIG. 3C is a flowchart that shows an example of a voice data analysis processing performed in a step S303 of FIG. 3A.

As shown in FIG. 3C, first, in a step S312, the voice data analyzing unit 116 determines whether or not the sound volume of the second voice data is larger than the sound volume of the first voice data. In the case that the sound volume of the second voice data is larger than the sound volume of the first voice data (YES in the step S312), the voice data analysis processing proceeds to a step S313, and otherwise (NO in the step S312), the voice data analysis processing proceeds to a step S314. For example, the decibel level is used to compare the sound volume of the second voice data with the sound volume of the first voice data.

In the step S313, the voice data analyzing unit 116 determines that the second voice data disturbs the first voice data, and then ends the voice data analysis processing.

In the step S314, the voice data analyzing unit 116 determines that the second voice data does not disturb the first voice data, and then ends the voice data analysis processing.

Next, specific examples of the respective processing shown in the flowcharts of FIGS. 2, 3A, 3B, and 3C will be described with reference to FIGS. 4A, 4B, 4C, 4D, 4E, and 5.

FIGS. 4A, 4B, 4C, 4D, and 4E are diagrams that show examples of scenes in the virtual space that is created by VR and is provided by the server 111. FIG. 5 is a table that shows an example of a friend registration status list, which is data registered in advance by the server 11 and indicates whether or not there is a friendly relationship between avatars. Here, in the present embodiment, the friend registration status list has been registered in advance in the ROM 102*b* or the HDD 104*b*, but is not limited to this as long as the CPU 101*b* (an obtaining unit) is able to obtain the friend registration status list when performing the determination process of the step S308.

Figure 4A:
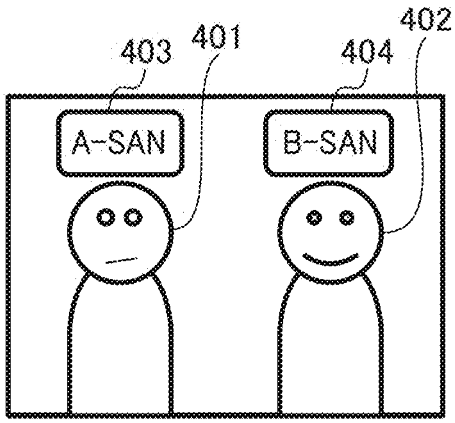
FIGS. 4A, 4B, 4C, 4D, and 4E are diagrams that show examples of scenes in the virtual space created by VR and provided by the server.

FIG. 4A shows a first avatar 401 and a second avatar 402, captured from the front, participating as spectators in a live music event held in the virtual space.

As shown in FIG. 4A, the first avatar 401 and the second avatar 402 are side by side, and right in front of the first avatar 401 and the second avatar 402 is a stage for the live music event in progress, creating a noisy environment with singing and playing of performers, cheers of other spectators, etc. As described above, the first avatar 401 is an avatar operated by the user of the first user terminal 100-1, and the second avatar 402 is an avatar operated by the user of the second user terminal 100-2.

In addition, as shown in FIG. 4A, a name 403 of the first avatar 401, "A-san", is displayed above the head of the first avatar 401 so as to be visible to other avatars. Similarly, a name 404 of the second avatar 402, "B-san", is displayed above the head of the second avatar 402 so as to be visible to the other avatars.

Figure 4B:
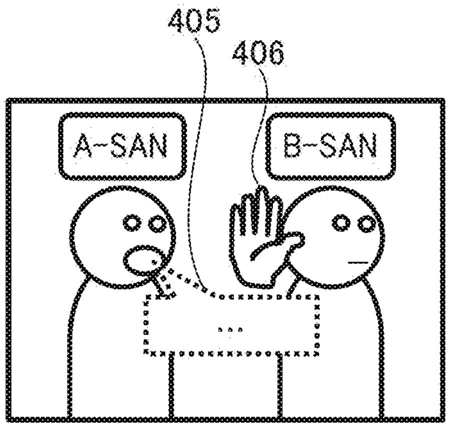

FIG. 4B shows a scene in which, from the state of FIG. 4A, the user of the first user terminal 100-1 utters a voice into the microphone 107-1, the processing proceeds from the step S201 to the step S203, and the association determination processing (see FIG. 3B) is about to be executed from the step S306.

A dashed line speech bubble 405 indicates that voice data corresponding to the voice " . . . " uttered by the user of the first user terminal 100-1 is being generated from the first avatar 401 as a sound source. The dashed line speech bubble 405 is displayed in FIG. 4B only for explanatory purposes and is not displayed in the virtual space. A hand 406 is the right hand of the second avatar 402.

In the step S306, the association determining unit 115 determines whether or not the second avatar 402 is placing his/her hand on his/her ear toward the first avatar 401, which is the sound source of the first voice data. As shown in FIG. 4B, the hand 406 of the second avatar 402 is located on the right side face of the face of the second avatar 402, and the first avatar 401 is located on the right side of the second avatar 402. Therefore, the association determining unit 115 determines that the second avatar 402 is placing his/her hand on his/her ear toward the first avatar 401, and then the association determination processing proceeds to the step S307.

Figure 4C:
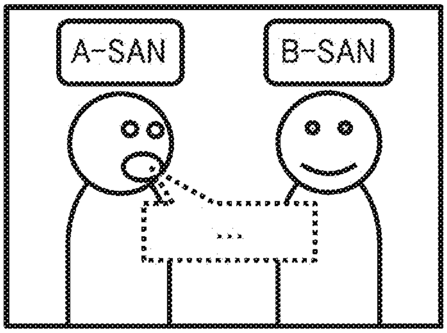

FIG. 4C shows a scene in which, from the state of FIG. 4A, the user of the first user terminal 100-1 utters a voice into the microphone 107-1, the processing proceeds from the step S201 to the step S203, and the association determination processing (see FIG. 3B) is about to be executed from the step S306.

In the step S306, the association determining unit 115 determines whether or not the second avatar 402 is placing his/her hand on his/her ear toward the first avatar 401, which is the sound source of the first voice data. As shown in FIG. 4C, since the second avatar 402 has the hand 406 (not shown) down, the association determining unit 115 determines that the second avatar 402 is not placing his/her hand on his/her ear toward the first avatar 401, and then the association determination processing proceeds to the step S308.

In the step S308, the association determining unit 115 determines whether or not the first avatar 401 and the second avatar 402 are in a friendly relationship. As shown in FIG. 5, "name of avatar (A-san)" representing the first avatar 401 and "name of avatar (B-san)" representing the second avatar 402 have been registered as friends with each other. Therefore, the association determining unit 115 determines that the first avatar 401 and the second avatar 402 are in a friendly relationship, and then the association determination processing proceeds to the step S307.

Figure 4D:
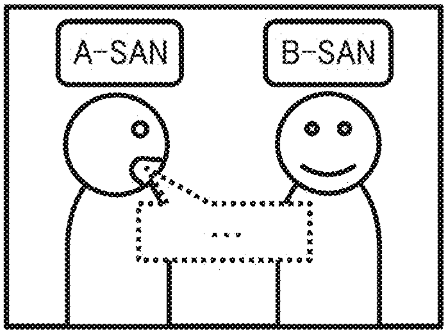

FIG. 4D shows a scene in which, from the state of FIG. 4A, the user of the first user terminal 100-1 utters a voice into the microphone 107-1, the processing proceeds from the step S201 to the step S203, and the association determination processing (see FIG. 3B) is about to be executed from the step S306.

In the step S306, the association determining unit 115 determines whether or not the second avatar 402 is placing his/her hand on his/her ear toward the first avatar 401, which is the sound source of the first voice data. As shown in FIG. 4D, similar to FIG. 4C, the second avatar 402 has the hand 406 (not shown) down, so the association determination processing proceeds to the step S308.

In the step S308, the association determining unit 115 determines whether or not the first avatar 401 and the second avatar 402 are in a friendly relationship. However, here, a friend registration status different from the friend registration status between avatars, which is shown in FIG. 5, has been registered in the server 111. Specifically, in this example, the friend registration status indicates that "name of avatar (A-san)" representing the first avatar 401 and "name of avatar (B-san)" representing the second avatar 402 have not been registered as friends of each other. Therefore, the association determining unit 115 determines that the first avatar 401 and the second avatar 402 are not in a friendly relationship, and then the association determination processing proceeds to the step S309.

In the step S309, the association determining unit 115 determines whether or not the first avatar 401 is facing a direction of the second avatar 402 (the first avatar 401 faces the second avatar 402). As shown in FIG. 4D, since the second avatar 402 is present right in front of the first avatar 401, that is, the second avatar 402 is present on an extension line in a line-of-sight direction of the first avatar 401, the association determining unit 115 determines that the first avatar 401 faces the second avatar 402, and then the association determination processing proceeds to the step S307.

Figure 4E:
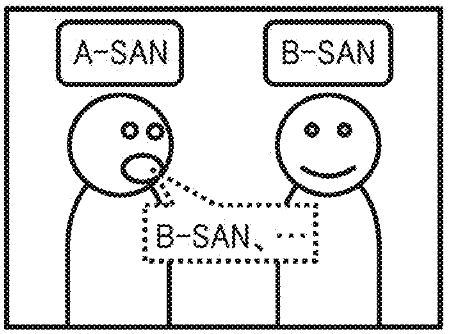

FIG. 4E shows a scene in which, from the state of FIG. 4A, the user of the first user terminal 100-1 utters a voice into the microphone 107-1, the processing proceeds from the step S201 to the step S203, and the association determination processing (see FIG. 3B) is about to be executed from the step S306.

In the step S306, the association determining unit 115 determines whether or not the second avatar 402 is placing his/her hand on his/her ear toward the first avatar 401, which is the sound source of the first voice data. As shown in FIG. 4E, similar to FIG. 4C, the second avatar 402 has the hand 406 (not shown) down, so the association determination processing proceeds to the step S308.

In the step S308, the association determining unit 115 determines whether or not the first avatar 401 and the second avatar 402 are in a friendly relationship. However, here, a friend registration status different from the friend registration status between avatars, which is shown in FIG. 5, has been registered in the server 111. Specifically, in this example, the friend registration status indicates that "name of avatar (A-san)" representing the first avatar 401 and "name of avatar (B-san)" representing the second avatar 402 have not been registered as friends of each other. Therefore, the association determining unit 115 determines that the first avatar 401 and the second avatar 402 are not in a friendly relationship, and then the association determination processing proceeds to the step S309.

In the step S309, the association determining unit 115 determines whether or not the first avatar 401 is facing a direction of the second avatar 402 (the first avatar 401 faces the second avatar 402). As shown in FIG. 4E, since the second avatar 402 is not present right in front of the first avatar 401, that is, the second avatar 402 is not present on the extension line in the line-of-sight direction of the first avatar 401, the association determining unit 115 determines that the first avatar 401 does not face the second avatar 402, and then the association determination processing proceeds to the step S310.

In the step S310, the association determining unit 115 determines whether or not the name 404 of the second avatar 402 is included in the first voice data whose sound source is the first avatar 401. As shown in FIG. 4E, since the name 404 of the second avatar 402, "B-san", is included in the first voice data, the association determination processing proceeds to the step S307.

Thus, according to the present embodiment, in the case that it is determined that the first voice data is associated with the second avatar and it is analyzed that the second voice data disturbs the first voice data, the sound volume of the voice data to be transmitted to the second user terminal 100-2 is adjusted. As a result, even in a noisy environment in the virtual space, a user A is able to establish a conversation with a desired person, a user B.

In the above description, the adjustment of the sound volume of the voice data to be transmitted to the second user terminal 100-2 is automatically performed by the server 111, and the user does not know whether the sound volume has been adjusted or not. However, it may be possible to store information indicating that the sound volume adjusting unit 117 has adjusted the sound volume of the voice data to be transmitted to the second user terminal 100-2, and the first user terminal 100-1 and the second user terminal 100-2 may be notified that the sound volume has been adjusted. As a result, the user of the first user terminal 100-1 is able to know that the sound volume of the voice uttered by the user of the first user terminal 100-1 has been adjusted so that it can be easily heard by the user of the second user terminal 100-2. In addition, in the case that the sound volume of the second voice data is decreased in the step S305, the user of the second user terminal 100-2 is able to know the reason why the sound volume of the second voice data is decreased.

In addition, in the above description, in the case that it is determined that the first voice data is associated with the second avatar and it is analyzed that the second voice data disturbs the first voice data, the sound volume of the voice data to be transmitted to the second user terminal 100-2 always has been adjusted. However, instead of always automatically adjusting the sound volume, the sound volume adjusting unit 117 may transmit an inquiry to the user of the second user terminal 100-2 as to whether or not to adjust the sound volume, and allow the user to choose whether or not to adjust the sound volume. In this case, in the step S305, instead of adjusting the sound volume of the voice data to be transmitted to the second user terminal 100-2, the sound volume adjusting unit 117 stores information indicating that the sound volume should be adjusted and an adjustment amount of the sound volume of the voice data. Thereafter, the voice data with the unadjusted sound volume and the inquiry for prompting the user to choose whether or not to adjust the sound volume are transmitted to the second user terminal 100-2. In response to this inquiry, the input/output unit 112-2 of the second user terminal 100-2 causes the HMD 106-2 to display a dialog box prompting the user to choose whether or not to adjust the sound volume, allowing the user to choose whether or not to adjust the sound volume with the controller 109-2. In the case that the user has chosen to adjust the sound volume, a sound volume adjustment request is transmitted to the server 111, and the sound volume adjusting unit 117 adjusts the sound volume of the voice data by the stored adjustment amount and then transmits the voice data with the adjusted sound volume to the second user terminal 100-2.

In addition, in the above description, the determinations of the steps S306 to S310 of the association determination processing are performed in the order of the steps, but may be performed based on "an OR condition" in which the determinations of the steps S306 to S310 are performed simultaneously and the processing proceeds to the step S307 when any one of the determinations of the steps S306 to S310 is established. In addition, the determinations of the steps S306 to S310 of the association determination processing may be performed based on "an AND condition" in which the processing proceeds to the step S307 when some of the determinations of the steps S306 to S310 is established simultaneously. For example, in the case of the AND condition of the steps S308 and S309, in the case that the first avatar and the second avatar are in a friendly relationship and the first avatar faces the second avatar, the processing may proceed to the step S307.

In addition, in the above description, the adjustment of the sound volume of the voice data to be transmitted to the second user terminal 100-2 is performed by the server 111, but may be performed by the second user terminal 100-2. In this case, the server 111 transmits, to the second user terminal 100-2, the voice data with the unadjusted sound volume and an adjustment amount of the sound volume of each piece of the voice data.

In addition, in the above description, a client-server system in which the server 111 exists has been described, but a peer-to-peer system may also be used. In this case, the server 111 does not exist, and the functional configuration and the processing of the server 111 are performed by the user terminal 100 instead of the server 111.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-172214, filed on Oct. 3, 2023, which is hereby incorporated by reference herein in its entirety.

What is claimed is:

1. An information processing system that comprises three or more multiple user terminals, each including a voice input unit and a voice output unit, connected via a network, and provides a virtual space including avatars linked to the multiple user terminals, respectively, the information processing system comprising:

a voice generating unit configured to generate voice data whose sound source is each avatar linked to each of the multiple user terminals based on a voice inputted into the voice input unit of each of the multiple user terminals; and one or more processors and/or circuitry configured to:

execute a voice data transmitting processing that transmits, to the multiple user terminals, the voice data whose sound source is each avatar;

execute an association determination processing that determines whether or not first voice data whose sound source is a first avatar linked to a first user terminal among the multiple user terminals is associated with a second avatar linked to a second user terminal among the multiple user terminals;

execute a voice data analysis processing that analyzes the first voice data among voice data to be transmitted to the second user terminal by the voice data transmitting processing, and second voice data excluding the first voice data; and execute a sound volume adjustment processing that, in a case that it is determined in the association determination processing that the first voice data is associated with the second avatar and it is analyzed in the voice data analysis processing that the second voice data disturbs the first voice data, adjusts a sound volume of the voice data to be transmitted to the second user terminal, which is outputted from the voice output unit of the second user terminal, wherein in the association determination processing, in a case that the second avatar is placing his/her hand on his/her ear toward the first avatar, it is determined that the first voice data is associated with the second avatar.

2. The information processing system according to claim 1, wherein in the sound volume adjustment processing, a sound volume of the first voice data among the voice data to be transmitted to the second user terminal is increased.

3. The information processing system according to claim 1, wherein in the sound volume adjustment processing, a sound volume of the second voice data among the voice data to be transmitted to the second user terminal is decreased.

4. The information processing system according to claim 1, wherein the multiple user terminals each further include a first detecting unit configured to detect movements of hands of a user who uses the user terminal; and a setting unit configured to set a position in the virtual space of the avatar linked to the user terminal in response to a user operation, the one or more processors and/or circuitry is further configured to execute an avatar movement control processing that, in a case that the movements of the hands have been detected by the first detecting unit of the second user terminal, moves hands of the second avatar in response to the detection result, and in the association determination processing, it is determined whether or not the second avatar is placing his/her hand on his/her ear toward the first avatar, in response to the set positions of the first avatar and the second avatar and movements of the hands of the second avatar which have been controlled by the avatar movement control processing.

5. The information processing system according to claim 1, wherein in the association determination processing, in a case that the first avatar and the second avatar are in a friendly relationship, it is determined that the first voice data is associated with the second avatar.

6. The information processing system according to claim 5, wherein the one or more processors and/or circuitry is further configured to execute an obtaining processing that obtains data indicating whether or not there is a friendly relationship between the avatars linked to the multiple user terminals, and in the association determination processing, it is determined whether or not the first avatar and the second avatar are in a friendly relationship based on the data.

7. The information processing system according to claim 1, wherein in the association determination processing, in a case that the first avatar faces the second avatar, it is determined that the first voice data is associated with the second avatar.

8. The information processing system according to claim 7, wherein in the association determination processing, in a case that the second avatar is present on an extension line in front of the first avatar's face, it is determined that the first avatar faces the second avatar.

9. The information processing system according to claim 8, wherein the multiple user terminals each further include a setting unit configured to set a position in the virtual space of the avatar linked to the user terminal in response to a user operation, and in the association determination processing, it is determined whether or not the second avatar is present on the extension line in front of the first avatar's face, in response to the set positions of the first avatar and the second avatar.

10. The information processing system according to claim 7, wherein in the association determination processing, in a case that the second avatar is present in a line-of-sight direction of the first avatar, it is determined that the first avatar faces the second avatar.

11. The information processing system according to claim 10, wherein the multiple user terminals each further include a setting unit configured to set a position in the virtual space of the avatar linked to the user terminal in response to a user operation; and a second detecting unit configured to detect a line of sight of a user who uses the user terminal, the one or more processors and/or circuitry is further configured to execute a line-of-sight direction setting processing that sets the line-of-sight direction of the first avatar in response to the set position of the first avatar and the line of sight detected by the second detecting unit of the first user terminal, and in the association determination processing, it is determined whether or not the second avatar is present in the set line-of-sight direction of the first avatar, in response to the set position of the second avatar.

12. The information processing system according to claim 1, wherein in the association determination processing, in a case that a name of the second avatar is included in the first voice data, it is determined that the first voice data is associated with the second avatar.

13. The information processing system according to claim 1, wherein in the voice data analysis processing, in a case that a sound volume of the second voice data is larger than a sound volume of the first voice data, it is analyzed that the second voice data disturbs the first voice data.

14. The information processing system according to claim 1, wherein in the sound volume adjustment processing, information, which indicates that the sound volume of the voice data to be transmitted to the second user terminal has been adjusted, is stored, and each of the first user terminal and the second user terminal is notified that the sound volume has been adjusted.

15. The information processing system according to claim 1, wherein in the sound volume adjustment processing, in the case that it is determined in the association determination processing that the first voice data is associated with the second avatar and it is analyzed in the voice data analysis processing that the second voice data disturbs the first voice data, an inquiry as to whether or not to adjust the sound volume is made to the second user terminal, and in a case that a user's choice to adjust the sound volume is made by using the second user terminal with respect to the inquiry, the sound volume is adjusted.

16. The information processing system according to claim 1, wherein the multiple user terminals each include a head mounted display (HMD) to be worn by a user who uses the user terminal.

17. An edge device that functions as one of the multiple user terminals, which are included in the information processing system according to claim 1, the edge device comprising:

one or more processors and/or circuitry configured to execute the sound volume adjustment processing.

18. A server that is included in the information processing system according to claim 1 and that is connected to the multiple user terminals via the network, the server comprising:

one or more processors and/or circuitry configured to execute the voice data transmitting processing, the association determination processing, and the voice data analysis processing.

19. A control method for an information processing system that comprises three or more multiple user terminals, each including a voice input unit and a voice output unit, connected via a network, and provides a virtual space including avatars linked to the multiple user terminals, respectively, the control method comprising:

a voice generating step of generating voice data whose sound source is each avatar linked to each of the multiple user terminals based on a voice inputted into the voice input unit of each of the multiple user terminals;

a voice data transmitting step of transmitting, to the multiple user terminals, the voice data whose sound source is each avatar;

an association determining step of determining whether or not first voice data whose sound source is a first avatar linked to a first user terminal among the multiple user terminals is associated with a second avatar linked to a second user terminal among the multiple user terminals;

a voice data analyzing step of analyzing the first voice data among voice data to be transmitted to the second user terminal by the voice data transmitting step, and second voice data excluding the first voice data; and a sound volume adjusting step of, in a case that it is determined in the association determining step that the first voice data is associated with the second avatar and it is analyzed in the voice data analyzing step that the second voice data disturbs the first voice data, adjusting a sound volume of the voice data to be transmitted to the second user terminal, which is outputted from the voice output unit of the second user terminal, wherein in the association determining step, in a case that the second avatar is placing his/her hand on his/her ear toward the first avatar, it is determined that the first voice data is associated with the second avatar.

20. A non-transitory computer-readable storage medium storing a program for causing a computer to function as the edge device according to claim 18 by reading and executing the program into the computer and to execute the control method according to claim 19.

21. A non-transitory computer-readable storage medium storing a program for causing a computer to function as the server according to claim 19 by reading and executing the program into the computer and to execute the control method according to claim 19.

* * * * *